(12) United States Patent
Bizjak et al.

(10) Patent No.: US 10,116,209 B2
(45) Date of Patent: Oct. 30, 2018

(54) SYSTEM AND METHOD FOR STARTING A SWITCHED-MODE POWER SUPPLY

(71) Applicant: Infineon Technologies AG, Neubiberg (DE)

(72) Inventors: Luca Bizjak, Villach (AT); Emanuele Bodano, Villach (AT); Stefano Marsili, Faak am See (AT); Joachim Pichler, Landskron (AT)

(73) Assignee: INFINEON TECHNOLOGIES AG, Neubiberg (DE)

(*) Notice: Subject to any disclaimer, the term of this patent is extended or adjusted under 35 U.S.C. 154(b) by 13 days.

(21) Appl. No.: 14/749,170

(22) Filed: Jun. 24, 2015

(65) Prior Publication Data

US 2016/0380537 A1    Dec. 29, 2016

(51) Int. Cl.
| | | |
|---|---|---|
| *H02M 3/158* | (2006.01) | |
| *H02M 3/156* | (2006.01) | |
| *H02M 1/36* | (2007.01) | |
| *H02M 1/00* | (2006.01) | |

(52) U.S. Cl.
CPC ............. *H02M 3/158* (2013.01); *H02M 1/36* (2013.01); *H02M 3/156* (2013.01); *H02M 2001/0022* (2013.01)

(58) Field of Classification Search
CPC .................. G05F 1/10; H02M 1/4225; H02M 2001/0022; H02M 2001/0029; H02M 3/156; H02M 3/157; H02M 3/158; H02M 1/36
See application file for complete search history.

(56) References Cited

U.S. PATENT DOCUMENTS

| | | | | |
|---|---|---|---|---|
| 5,550,702 | A  * | 8/1996 | Schmidt ................. | H02H 9/025 361/103 |
| 7,508,176 | B2 * | 3/2009 | Hartular ................ | H02M 3/156 323/268 |
| 2009/0261797 | A1* | 10/2009 | Shibata ................... | H02M 1/36 323/288 |
| 2011/0018515 | A1* | 1/2011 | McCloy-Stevens ....................... | H02M 3/1588 323/284 |
| 2012/0119713 | A1* | 5/2012 | Horita ...................... | H02P 9/48 322/23 |
| 2012/0176824 | A1* | 7/2012 | Franklin ................ | H02M 3/157 363/79 |

(Continued)

FOREIGN PATENT DOCUMENTS

CN          101014919 A      8/2007

OTHER PUBLICATIONS

"1.5A Step Down Switching Regulator," L4971, STMicroelectronics, Rev. 11, May 2005, 13 pgs.

(Continued)

*Primary Examiner* — Adolf Berhane
*Assistant Examiner* — Henry Lee, III
(74) *Attorney, Agent, or Firm* — Slater Matsil, LLP (57) ABSTRACT

A method of operating a switched-mode power supply (SMPS) includes starting up the switched-mode power supply by determining a rate of increase of a duty cycle of a pulse width modulated (PWM) signal based on an input voltage and a switching frequency of the SMPS; and generating the PWM signal having the duty cycle in accordance with the determined rate of increase.

26 Claims, 11 Drawing Sheets

(56) References Cited

U.S. PATENT DOCUMENTS

2014/0042993 A1\* 2/2014 Nagel ...................... H02P 3/14
  323/223
2014/0266110 A1\* 9/2014 Yuan .................... H02M 3/156
  323/282

OTHER PUBLICATIONS

"Dual, Multiphase Step-Down Voltage Mode DC/DC Controller with Accurate Current Sharing," LTC3861-1, Linear Technology, 2012, 38 pgs.

"High-Efficiency, Midrange-Input, Synchronous Buck Controller with Voltage Feed-Forward," TPS40077, Texas Instruments Inc., SLUS714-Jan. 2007—Revised Apr. 2009, 45 pgs.

\* cited by examiner

SYSTEM AND METHOD FOR STARTING A SWITCHED-MODE POWER SUPPLY

CROSS-REFERENCE TO RELATED APPLICATIONS

This application relates to the following and commonly assigned U.S. patent applications: Ser. No. 14/749,224, filed on Jun. 24, 2015, now U.S. Pat. No. 9,450,492, which application is incorporated herein by reference in its entirety.

TECHNICAL FIELD

The present invention relates generally to an electronic circuit, and, in particular embodiments, to a system and method for starting a switched-mode power supply.

BACKGROUND

Switched-mode power supply (SMPS) systems are widely used in many electronic applications from computers to automobiles. Generally, output voltages within SMPS systems are generated by performing a DC-DC, DC-AC, and/or AC-DC conversion by operating a switch coupled to an inductor or a transformer. Many SMPS systems use high value capacitors as an output load. The SMPS systems with inductors in series with high value output capacitors may cause high voltage and high current spikes during first turn-on.

When designing a SMPS system, various design attributes may be taken into account, for example, efficiency, power, and start-up control. An in-rush current during a start-up of the SMPS system may also be considered. The in-rush current is known as a peak instantaneous current that is caused by an output capacitor acting as short circuit when a power supply is first turned on. The input voltage of the SMPS system may drop significantly if a large current is drawn from the input voltage in a short amount of time and may cause the power supply to reset or prevent the power supply from starting up. A start-up circuit may be used in the SMPS system to reduce such in-rush current conditions, as well as prevent and avoid various overvoltage and/or overcurrent conditions during the start-up.

SUMMARY

In accordance with an embodiment, a method of operating a switched-mode power supply (SMPS) includes starting up the switched-mode power supply by determining a rate of increase of a duty cycle of a pulse width modulated (PWM) signal based on an input voltage and a switching frequency of the SMPS; and generating the PWM signal having the duty cycle in accordance with determined rate of increase.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a system and method for controlling a start-up of a switched-mode power supply (SMPS) system. Further embodiments of the present invention may also be applied to systems that utilize various SMPS systems during transition from an open loop start-up to a closed loop pulse width modulation (PWM) mode in order to regulate a target voltage at the output.

The SMPS system starts up by increasing a duty cycle from an initial duty cycle to a target duty cycle at a rate that quickly starts up the SMPS system while avoiding overcurrent conditions. In one embodiment, the rate at which the duty cycle increases is based on an input voltage Vin of the SMPS and a switching frequency $f_{sw}$ of the SMPS. In some implementations, the duty cycle is ramped up by increasing the duty cycle by a predetermined amount after a predetermined number of switching cycles. In some embodiments, the start-up procedure is performed in an open loop mode. A transition from the start-up mode to the open loop mode is made when the duty cycle reaches a threshold value or the output voltage of the SMPS system reaches a target voltage. The duty cycle value prior to the transition is initialized in an integrator of a feedback control loop and the SMPS system uses this initialized value of the duty cycle while transitioning to the closed loop pulse width modulation (PWM) mode.

In an embodiment, a digital controller circuit that includes an analog to digital converter (ADC), a proportional-integral-derivative (PID) controller and a digital pulse width modulator (DPWM) is used to control the duty cycle during the open loop start-up of the SMPS. At the beginning of start-up, the controller starts driving with a minimum initial duty cycle. The duty cycle is increased by 1 LSB (or more) for an integer number of switching cycles. A start-up time $T_{su}$ of a step down SMPS system is given by the following equation:

$$T_{su} = \frac{Vout}{Vin} * \frac{fck}{fsw} * \frac{N}{fsw}, \quad (1)$$

where Vout is the output voltage, Vin is the input voltage, $f_{ck}$ is a high frequency clock for a digital control block, and $f_{sw}$ is a switching frequency of the SMPS and N is an integer value. In an embodiment, a clock frequency $f_{ck}$ of 160 MHz may be chosen for a switching frequency $f_{sw}$ of 400 KHz or 2.2 MHz.

The integer value N is chosen such that it is a function of the input voltage Vin and the switching frequency $f_{sw}$. Equation (1) indicates that the start-up time $T_{su}$ may be independent of the input voltage Vin and inversely proportional to the switching frequency $f_{sw}$, when the integer value N is chosen to be a value that is directly proportional to the input voltage Vin and the switching frequency $f_{sw}$. The switching frequency $f_{sw}$ is also controlled by the clock frequency $f_{ck}$ according to the following relationship:

$$f_{ck}=OS*f_{sw}, \quad (2)$$

where OS is the oversampling factor representing the switching frequency $f_{sw}$ as a multiple of the digital clock frequency $f_{ck}$. In an embodiment, the OS factor is determined to be a value of 72 for a clock frequency $f_{ck}$ of 160 MHz and a switching frequency $f_{sw}$ of 2.2 MHz. Similarly, for a switching frequency $f_{sw}$ of 400 KHz, the OS factor is determined to be a value of 400. It should be understood that these of OS factor values are just one example of many possible values. Different embodiments may have based on different switching frequencies of $f_{sw}$ and clock frequencies fck.

A target duty cycle D during the closed loop PWM mode of operation of a buck SMPS system is linearly dependent on the input voltage Vin, as shown by the following equation:

$$D=Vout/Vin, \quad (3)$$

where Vout is the output voltage of the SMPS. In one example, embodiment, a SMPS is determined to have a target duty cycle of 12.5% based on an input voltage of 40 V and an output voltage of 5 V. In the present embodiment, the duty cycle is incremented until the target output voltage is reached and/or the target duty cycle is met. At this point, the open loop control of the start-up operation ends and the closed loop operation begins. An integral part of the PID controller is then initialized with the target duty cycle before transitioning from the start-up mode to the closed loop mode of operation. This provides a smooth transition from the open loop start-up to the closed loop PWM mode operation for the SMPS.

The present embodiment further provides a feedback control loop to handle fault conditions during the start-up. The fault condition may be one of an overcurrent situation or an overvoltage or an over temperature condition. If the overcurrent occurs during the start-up, the loop decreases the duty cycle by an LSB or more. The decrementing of the duty cycle continues until the fault condition i.e. overcurrent is removed. In an embodiment, where the SMPS is designed to drive a high current load that is close to the overcurrent limit, a transition with minimum overshoot mitigates any unwanted overshoot situation at the end of the start-up mode of operation.

Figure 1:
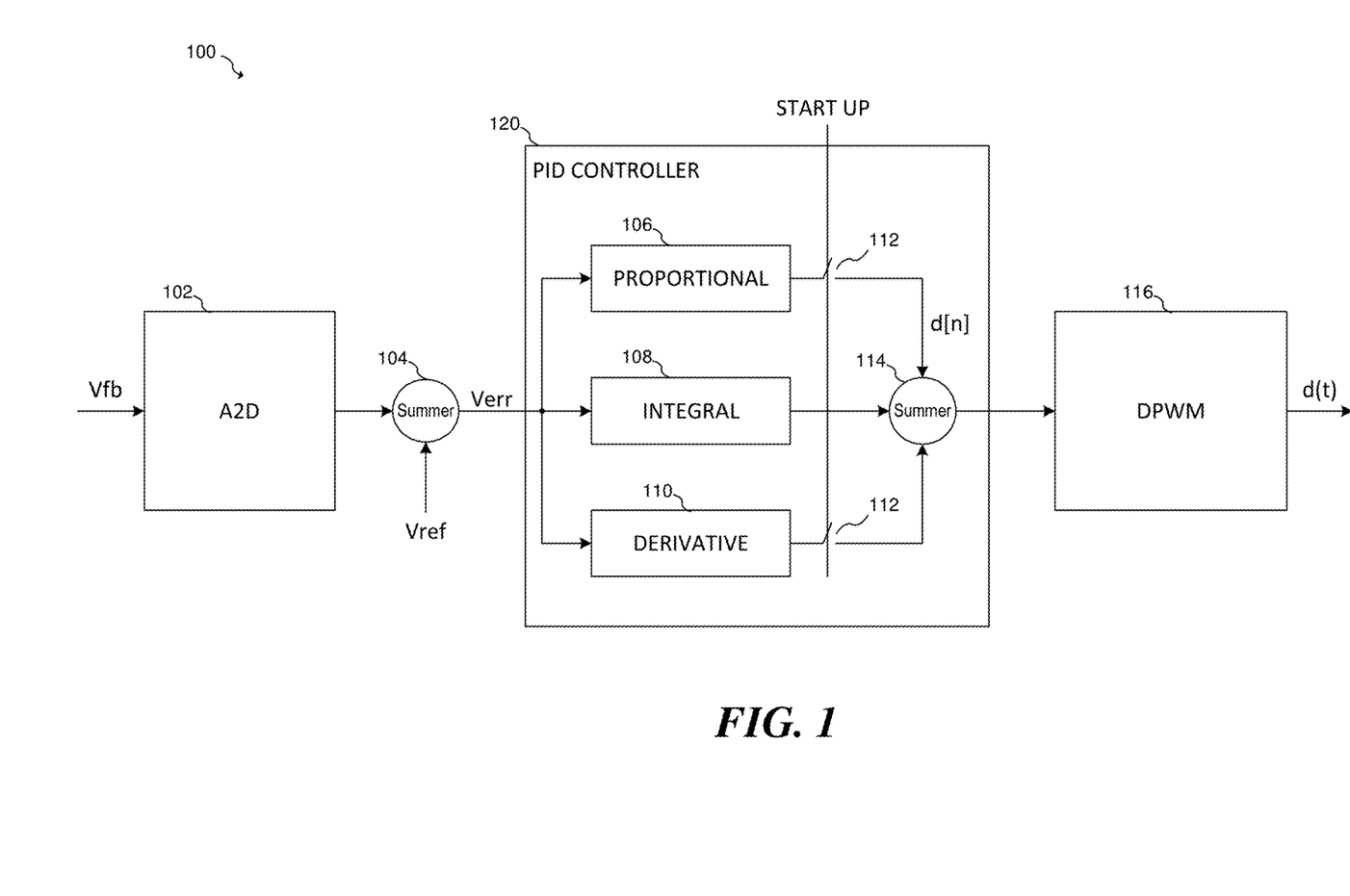
FIG. 1 illustrates a block diagram of an example digital start-up control circuit.

FIG. 1 illustrates a block diagram for an exemplary digital controller 100 of a SMPS system that includes an ADC 102, a summer 104, a PID controller 120 and a DPWM 116. The ADC 102 provides a digitized value of an output voltage of the SMPS as a feedback voltage Vfb. An error value Verr is generated by comparing Vfb with a reference value Vref in the summer 104. In general, an error value represents a difference between an actual value and a desired value of the system that needs to be corrected. The error value Verr is then applied to a proportional path 106, an integral path 108, and a derivative path 110 inside the PID controller 120. During start up, the integral path 108 is available in the PID controller 120. A Pair of switches 112 is used to couple the proportional path 106 and the derivative path 110 to a summing junction of PID controller 120. These two switches are open during the start-up and the integral path 108 is used to drive DPWM 116. The output of the PID controller 120 is coupled to the DPWM 116 to generate a duty cycle based on the output of the integral path 108.

During the start-up, the integral path 108 integrates the error value Verr from the summer 104 and generates a duty cycle for the SMPS. The PID controller 120 transitions to the closed loop PWM mode, when the feedback voltage Vfb reaches a target value representing an output voltage of the SMPS. In some applications, a mismatch between the target duty cycle and an actual applied duty cycle at the end of the start-up may cause the output voltage of the SMPS to overshoot which is undesirable. In some applications, a longer start-up time is used to cover variations of various design parameters, such as, the input voltage Vin, the compensation network, the switching frequency and the load current. In such cases, the duty cycle at the end of the start-up may be quite different than the target duty cycle used during the closed loop operation. The mismatch of the actual duty cycle and the target duty cycle at the end of start-up may cause undesirable overcurrent or overvoltage condition for the SMPS. In other applications, a fast start-up time may cause an overcurrent condition during the transition as the output voltage steps necessary to reach a target output may have to be large to meet the fast start-up time.

Figure 2:
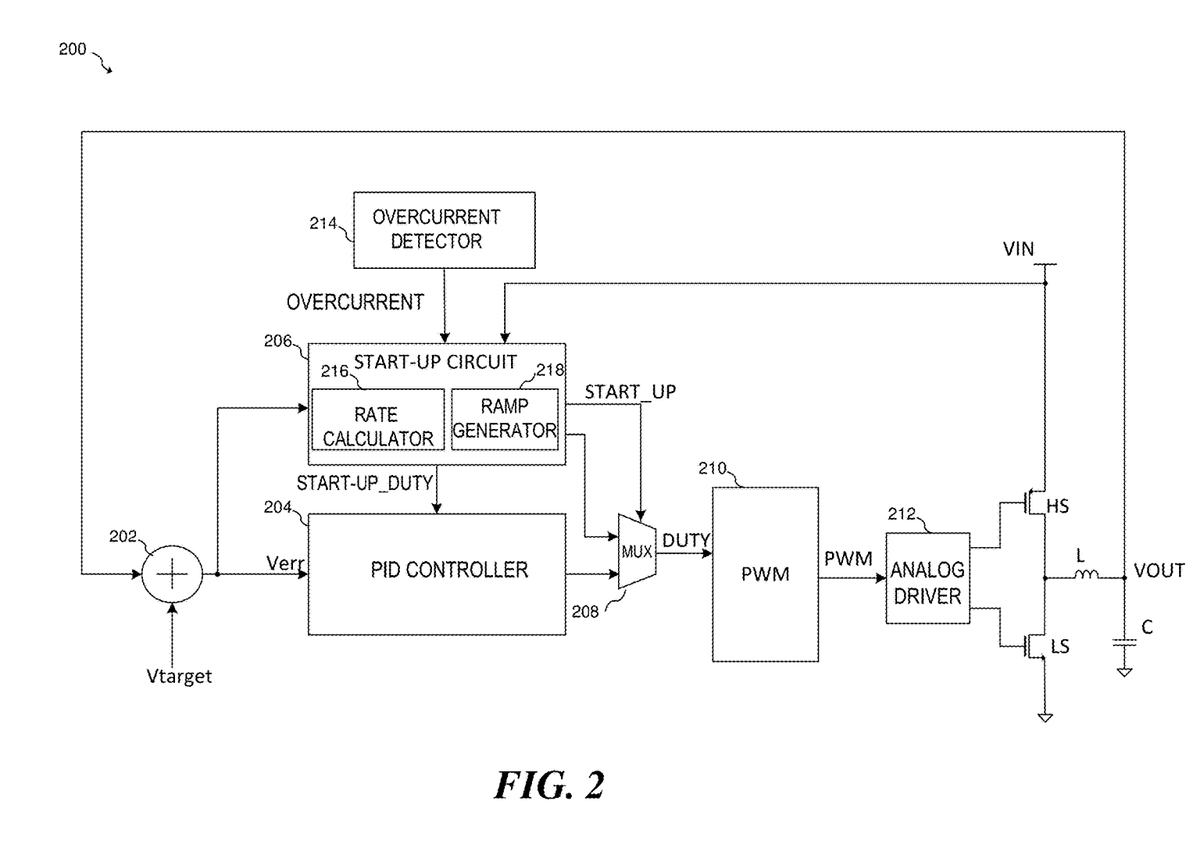
FIG. 2 illustrates a block diagram of an embodiment SMPS.

FIG. 2 illustrates a SMPS 200 that uses an embodiment start-up circuit 206 that includes a rate calculator 216 and a ramp generator 218. A start-up control loop operates with a start-up circuit 206 controlling a rate of increase of the duty cycle during the start-up of the SMPS. The rate is determined by the rate calculator 216 based on the input voltage VIN and the switching frequency $f_{sw}$ of the SMPS. The rate is used to generate a ramp in the ramp generator 218 and the ramp is provided to a pulse width modulator (PWM) circuit 210 to generate a pulse width modulated signal with an increasing duty cycle. The increasing duty cycle is used to drive an analog driver 212 that controls the switching of a high side (HS) and a low side (LS) switching transistors of the SMPS. The start-up circuit 206 also uses an OVERCURRENT signal from an overcurrent detector block 214 to decrease the duty cycle of the pulse width modulated signal until the overcurrent condition is removed. Furthermore, the start-up circuit 206 is also responsible for determining when to transition from the start-up to the closed loop mode for the SMPS. The decision to transition from the start-up to the closed loop is made when an output voltage VOUT of the SMPS reaches a target voltage Vtarget or the duty cycle reaches a threshold value. A control signal START_UP is generated in the start-up circuit 206 during the transition that controls an output of a multiplexer (MUX) 208.

The transition between the start-up to the closed loop operation takes place by the MUX 208 selecting an output from the PID controller 204 to provide to the PWM circuit 210. A summer 202 generates an error value Verr based on a feedback value Vfb of the output voltage and a reference value Vref. The error value Verr is compensated by the PID controller 204 to regulate the output voltage VOUT of the SMPS.

The start-up circuit 206 stores the duty cycle value prior to the transition in an integrator of the PID controller 204. The PID controller 204 is initialized with the duty cycle START_UP_DUTY that is close to the applied duty cycle prior to the transition to closed loop operation. The initialized value of the duty cycle minimizes any overshoot of voltage or current during the transition because the initialized duty cycle is closer to the applied duty cycle. In some embodiments, the output voltage VOUT and the input voltage VIN are digitized by an ADC. In some embodiments, the ramp generator 218 may be implemented by a counter. In another embodiment, the ramp generator 218 may be implemented by charging a capacitor with a current value proportional to the input voltage VIN and the switching frequency $f_{sw}$ of the SMPS. In some embodiments, the ramp generator may be a part of the start-up circuit 206 or a part of the PWM circuit 210.

Figure 3:
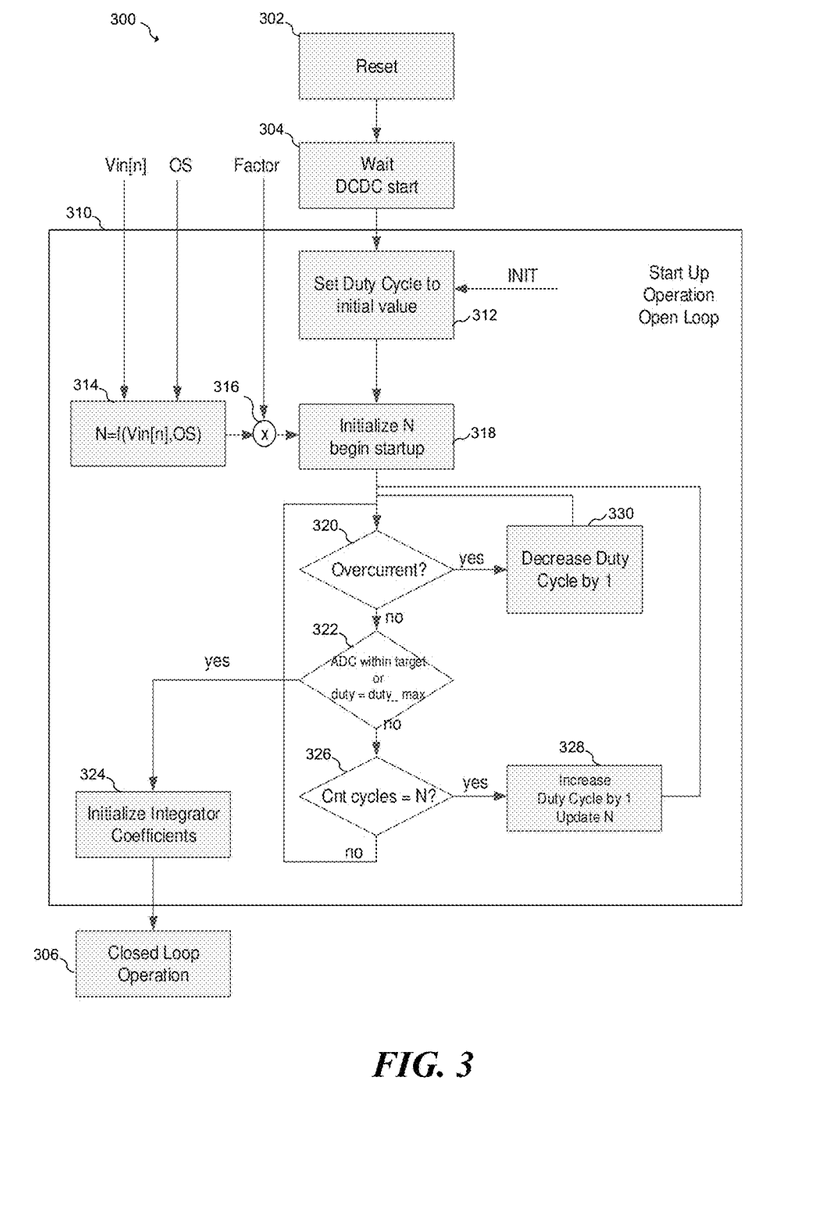
FIG. 3 illustrates a flow diagram for an embodiment SMPS.

FIG. 3 illustrates a flow diagram of an embodiment method 310 of a start-up controller system 300. The embodiment method provides a step by step description of the start-up control process in the flow diagram. At step 302, a reset occurs where the controller is reset to its initial value set in accordance with the SMPS requirement. The flow diagram then moves to step 304, where the controller generates a wait time before the open loop start-up control begins. The wait time allows various circuits of the SMPS to be ready before the start-up. The embodiment method 310 begins at step 312, where the controller is initialized with an initial minimum duty cycle value. In step 314, an integer value N representing the number of switching cycles for each duty cycle is calculated in accordance with an input voltage Vin[n] and a switching frequency $f_{sw}$. In step 316, the integer value N is multiplied with a value factor in accordance with the duty cycle to adjust a start-up time. In some embodiments, the integer value N is amplified where the SMPS is designed to adjust for a large output capacitor or for an independent adjustment of a start-up time.

As shown in FIG. 3, the flow diagram transitions from step 312 to step 318, where the value of N, representing a number of counts of switching cycles for each incremental step of the duty cycle, is initialized and controller begins open loop start-up by applying the initial duty cycle. Next, in step 320, a flow decision is made based on an overcurrent value. The value of overcurrent may be based on the load requirement of the SMPS, for example. If the SMPS experiences the overcurrent, then the flow diagram continues to step 330, where the duty cycle is decreased by 1 LSB. The duty cycle is decreased by 1 LSB until the overcurrent condition is removed. If there is no overcurrent, the flow diagram continues to step 322, where an exit condition decision is made. The exit condition decision is based on having at least one of the duty cycle value equal to a duty_max value or an ADC value equal or close to a target ADC value. The target ADC value represents the output voltage of the SPMS. When the exit condition decision is made the flow diagram transitions from incrementing the duty cycle to step 324. In step 324, an integrator is initialized with the applied duty cycle and the flow diagram moves to step 306. The initialization of the integrator ensures a smooth transition from the open loop start-up to the closed loop PWM mode of operation.

Step 306 indicates the end of open loop start-up and the beginning of closed loop pulse width modulation (PWM) mode of operation. However, if the duty cycle is below the duty_max and the ADC value is not within the target ADC value, the flow diagram moves to step 326. In step 326, a count cycle is compared with the integer value N. If the count cycle is less than N, then the flow diagram goes back to the beginning of state 320 with the same duty cycle and begins counting the number of switching cycles for each duty cycle. If the count cycle reaches the integer value N, then the duty cycle is incremented by one LSB, the integer value N is updated and the flow diagram goes back to the beginning of state 320 and repeats the same flow. The method provides the duty cycle value that is closer to the applied value during the transition from the start-up to the closed loop operation. The initialized value of the duty cycle is used by the controller during the open loop operation.

Figure 4:
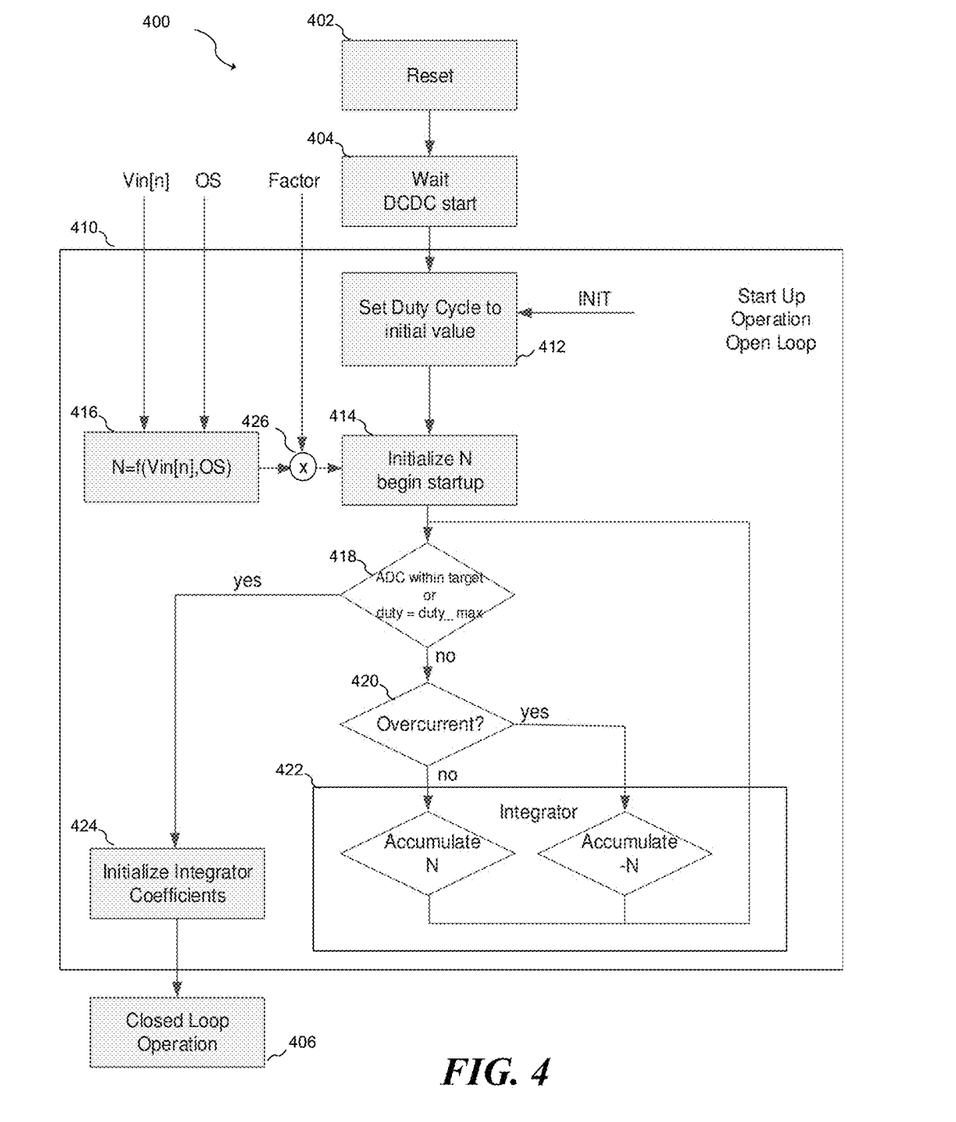
FIG. 4 illustrates a flow diagram for a second embodiment.

FIG. 4 illustrates a second flow diagram of another embodiment method 410 of a start-up controller 400. The embodiment method 410 is different from the embodiment method 310 as the embodiment method 410 reuses an accumulator used in an integral part of a PID controller. The accumulator keeps accumulating N until an exit condition is reached, and accumulates a negative N when an overcurrent condition is detected. The embodiment method 310 uses a separate count for an overcurrent condition, while the embodiment method 410 makes use of the accumulator in an integrator at step 422 of a PID controller that is adjusted during an overcurrent event to decrease the duty cycle of the SMPS during a start-up. The step 402 is similar to the controller 300 where the start-up controller 400 is reset to its initial value in accordance with the design of the SMPS. Next, in step 404, the start-up controller includes a wait time before it proceeds to an open loop start-up. The wait time allows the circuitry in the SMPS to be settled before the starting the SMPS. Next, in step 412, the start-up controller 400 is initialized with an initial minimum duty cycle value in accordance with an output voltage and an input voltage. In step 414, the integer value N is calculated in accordance with the input voltage Vin and the switching frequency $f_{sw}$ of the SMPS. The value of N may be calculated using a look up table (LUT).

In an embodiment, the integer value of N is determined to be 8 for an input voltage of less than 10 V, a switching frequency $f_{sw}$ of 2.2 MHz, a clock frequency $f_{ck}$ 160 MHz, and an output voltage of 5 V. The integer value of N is determined to be 16, when the input voltage is between 10 V and 20 V. The integer value of N is determined to be 32 when the input voltage is above 20 V. It is to be understood that these integer values of N are just one example of many possible values of N determined for different embodiments with different switching frequency $f_{sw}$, input voltage and clock frequency $f_{ck}$ combinations.

In step 426, the integer value of N is multiplied with a value factor to adjust for a large output capacitor or for an independent adjustment of a start-up time. In step 414, the integer value of N is initialized and the start-up controller 400 starts with the initial duty cycle. In step 418, a decision is made based on an ADC target value and a maximum duty cycle duty_max. The ADC target value is the digital value for the output voltage with some tolerances. The tolerance value may be chosen in accordance with the accuracy of the ADC measurement and an allowable ripple at the output voltage of the SMPS.

The flow diagram continues to step 418 to determine an exit condition based on the output voltage value being equal or close to the target ADC value or the duty cycle reaching the maximum duty cycle duty_max. When the exit condition is met, the flow diagram continues to step 424, where the applied duty cycle is initialized to the integrator 422 as an integrator coefficients in a feedback control loop of the SMPS. The flow diagram continues to step 406 after initializing the integrator and exits from the open loop start-up control to the closed loop PWM mode operation.

In step 418, if the ADC value is not within target and/or the duty cycle does not reach the maximum duty cycle duty_max, the flow diagram continues to step 420. In step 420, a decision is made based on an overcurrent value in the SMPS. The value of the overcurrent may be chosen based on the load current requirement of the SMPS. The flow diagram continues to step 422 to update an accumulator in the integrator of the feedback control loop of the SMPS. The accumulator accumulates a positive integer value of N in the absence of the overcurrent, however, accumulates a negative integer value of N in the presence of the overcurrent situation. At the end of step 422, the value N is updated and the flow diagram goes back to the beginning of state 418 and repeats the same flow. The present embodiment reuses the accumulator of the integrator in step 422 during the start-up and minimizes additional circuit implementation.

Figure 5A:
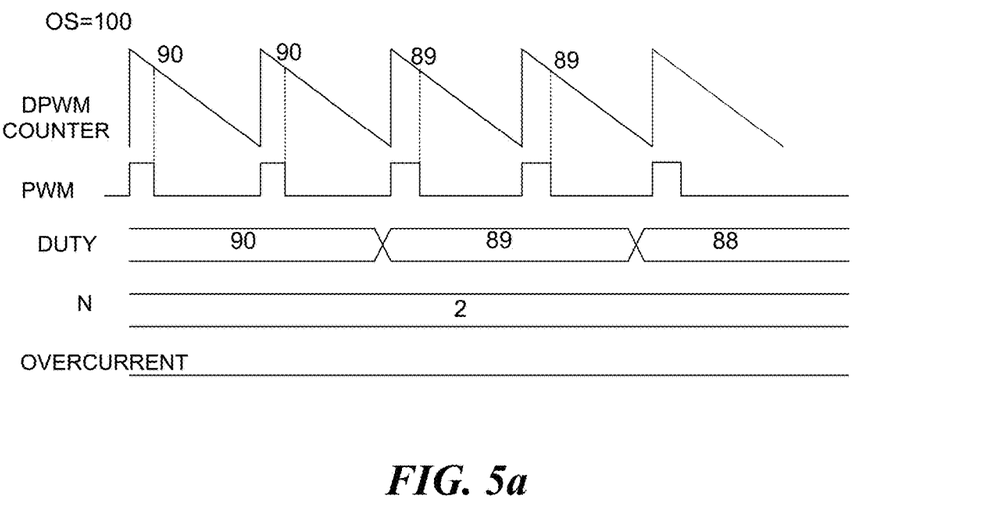
FIG. 5a and FIG. 5b illustrate waveform diagrams for various signals in the present embodiment during start-up period for a non-overcurrent and overcurrent situation.

FIG. 5a illustrates a waveform diagram of various signals within an embodiment start-up control circuit for a portion of a start-up period. The signal labeled DPWM COUNTER represents a waveform of a counter counting down from an oversampled OS value of 100. The signal DPWM COUNTER that controls a switching period of the SMPS resets to the OS value when it counts down to zero. The signal labeled PWM shows a waveform whose pulse width is modulated based on the value shown in the signal labeled as DUTY and represents the switching period of the SMPS. An actual value of duty cycle of the SMPS is a function of the value DUTY. The signal labeled N represents a count value by which the value of the DUTY is increased. The value N represents the number of switching periods used for each value of duty cycle of the SMPS. The OVERCURRENT signal represents a digital waveform depicting an overcurrent event with a non-zero level and absence of an overcurrent event with a zero level. As shown in FIG. 5a, the start-up control circuit is providing a decreasing DUTY value for every N PWM period. The value of DUTY begins at 90 and decreases to 89 after two PWM periods. In the absence of an overcurrent event, it continues to decrease until the value of DUTY equals to a threshold value or an output of the SMPS reaches a target value.

Figure 5B:
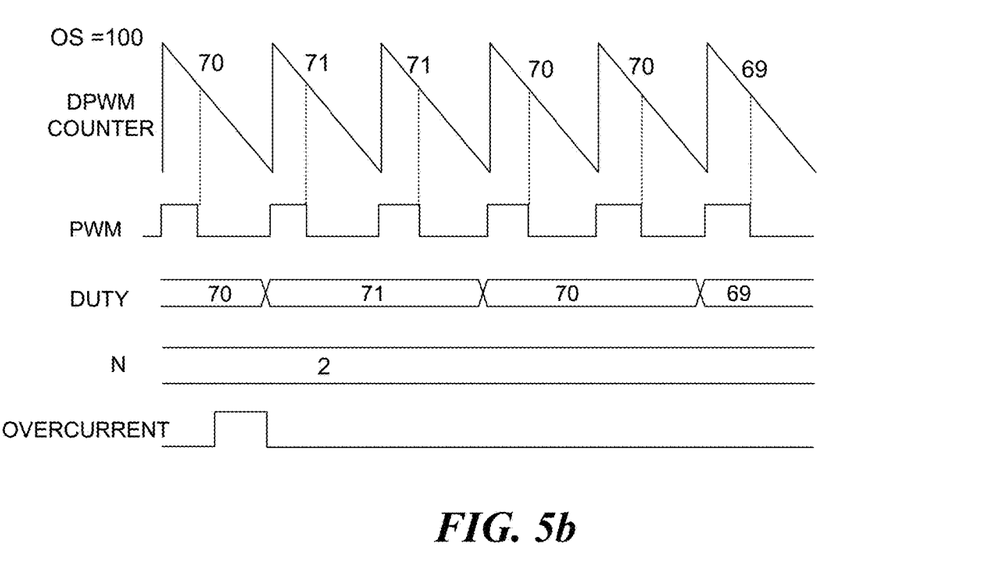

FIG. 5b illustrates a waveform diagram of the signals depicted in FIG. 5a for the embodiment in an overcurrent situation. The signal DPWM COUNTER continues counting from the OS value of 100. The signal DUTY begins with a value of 70 and it is decreased after every two switching periods as shown by the value 2 for the signal N. As shown in FIG. 5b, an overcurrent event takes place during the first period of PWM. The OVERCURRENT signal goes high and it causes the value of DUTY to increase to 71. The increased value of DUTY decreases the actual duty cycle to reduce an output current of the SMPS. The overcurrent event is removed when OVERCURRENT signal goes low. The OVERCURRENT signal going low indicates that the overcurrent condition is removed and the SMPS goes back to increasing duty cycle. Accordingly, the value of DUTY is decreased to 70 and continues to decrease after every N period.

Figure 5C:
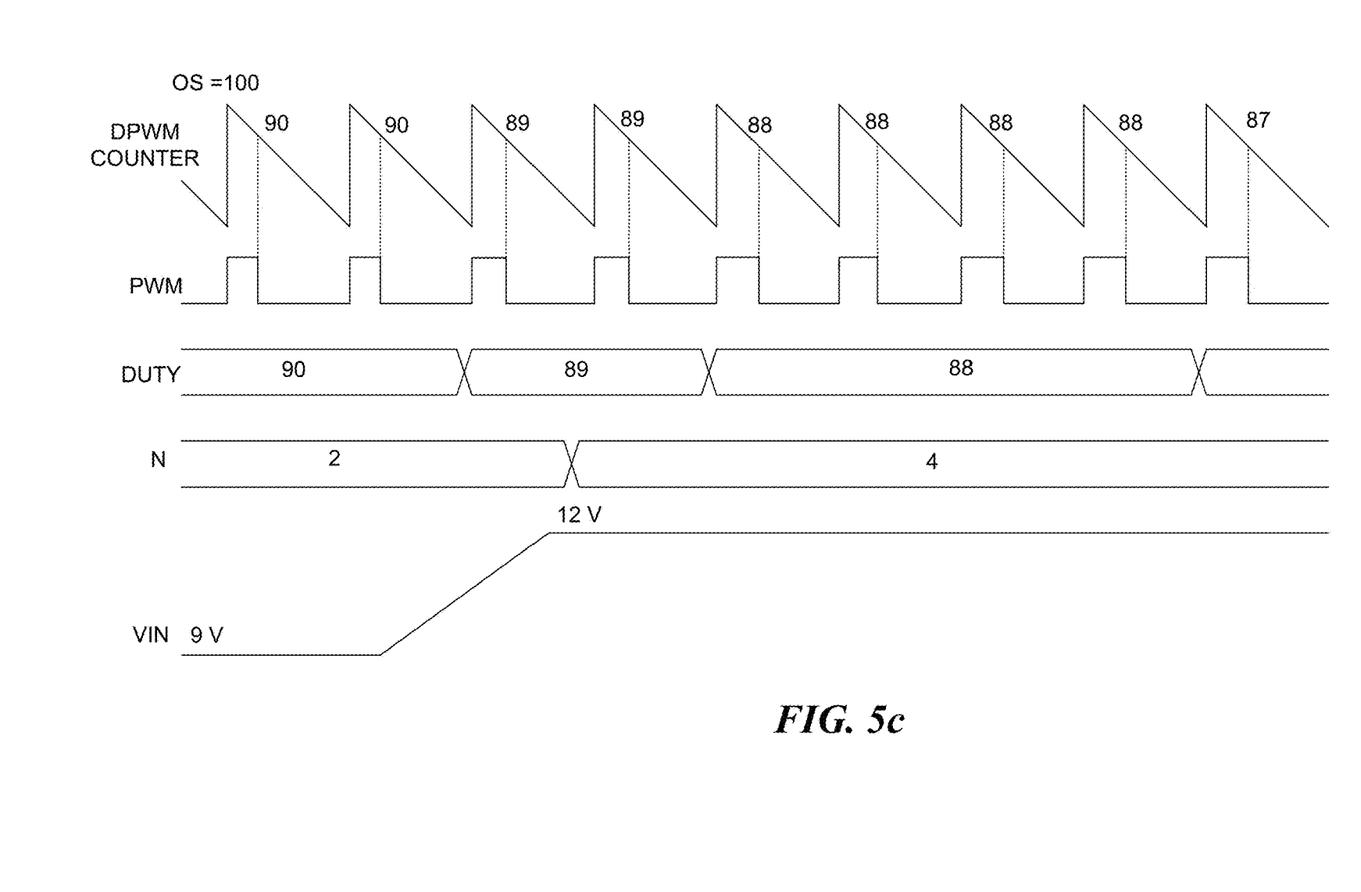
FIG. 5c illustrates a waveform diagram for various signals in the present embodiment for an input voltage changes.

FIG. 5c illustrates another waveform diagram of the signals depicted in FIG. 5a and FIG. 5b for the present embodiment in a situation where an input voltage of the SMPS is increased from a value of 9 V to 12 V. The input voltage of the SMPS is represented by the signal VIN in FIG. 5c. The FIG. 5c shows a portion of a start-up period, as depicted in FIG. 5a and FIG. 5b that begins with the signal DUTY decreasing every 2 PWM period as shown by the value of signal N. The signal DUTY starts from 90 and it is decreased after two periods of the signal PWM. As the VIN signal goes from 9 V to 12 V indicating a rise in the input voltage of the SMPS, the start-up control circuit reacts to it by increasing the value of the signal N from 2 to 4. The signal DUTY decreases its value after every 4 PWM cycle as seen by the signal PWM which changes its pulse width after 4 cycles. Accordingly, the signal DUTY decreases from 88 to 87 after 4 PWM cycles.

Figure 6:
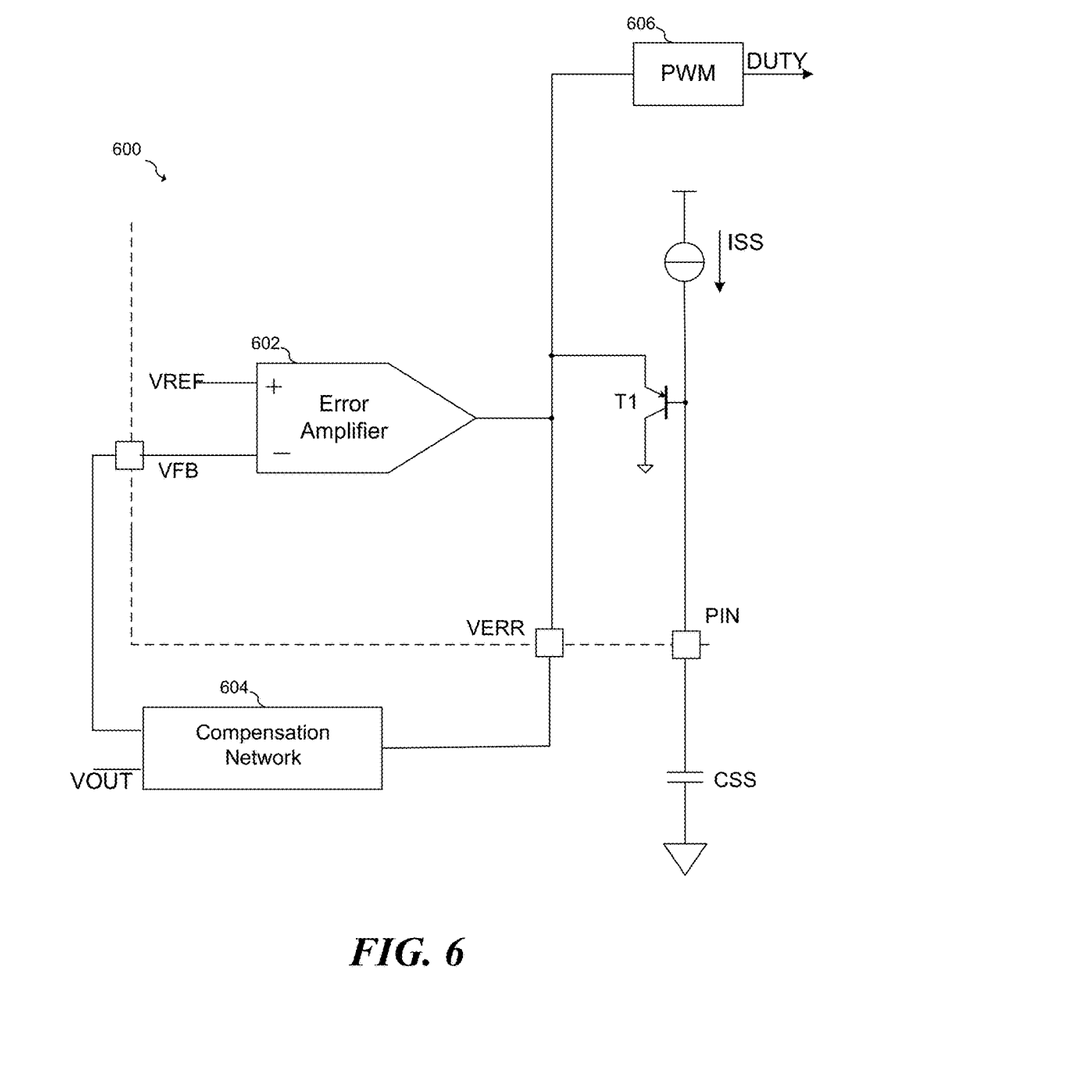
FIG. 6 illustrates an example start-up circuit.

FIG. 6 illustrates an example start-up system 600 that includes an error amplifier 602, a pnp bipolar transistor T1, a compensation network 604, and a pulse width modulation (PWM) generator 606. The error amplifier 602 generates an error voltage VERR, based on a reference voltage VREF and a feedback voltage VFB from the SMPS output. The compensation network 604 connected across an inverting input and an output of the error amplifier 602. Suitable values of the compensation network components are chosen to set the bandwidth of the loop of the SMPS. The output of the error amplifier 602 is connected to the input of the PWM generator 606 that generates a duty cycle based on the input received from the error amplifier 602 output. The bipolar transistor T1 is used to clamp the error amplifier 602 output to a value fixed by the voltage at a PIN where an external capacitor Css is connected. A bias current Iss is used to charge the base of the pnp transistor T1 that is coupled to the PIN and a slew rate of the base node of the T1 controls the emitter that goes to the input of the PWM generator 606.

The start-up time is controlled by the current value Iss and the capacitor value Css. The voltage ramp rate at the base node of T1 rises at a rate given by the equation:

$$dV/dt = Iss/Css, \qquad (4)$$

where Iss is the current charging the capacitor Css. This ramp rate dv/dt controls the input to the PWM generator 606 that changes the duty cycle at the same rate. In some embodiments, the value of Css or Iss is changed to increase or decrease a start-up time of the SMPS. The start-up system 600 utilizes an extra pin and an external capacitor for different applications of the SMPS that is integrated in a single IC. In some applications, a capacitor controls the switching frequency and the start-up time of the SMPS. Accordingly, different values of the capacitor are used for different switching frequencies, start-up times and input voltages.

Figure 7:
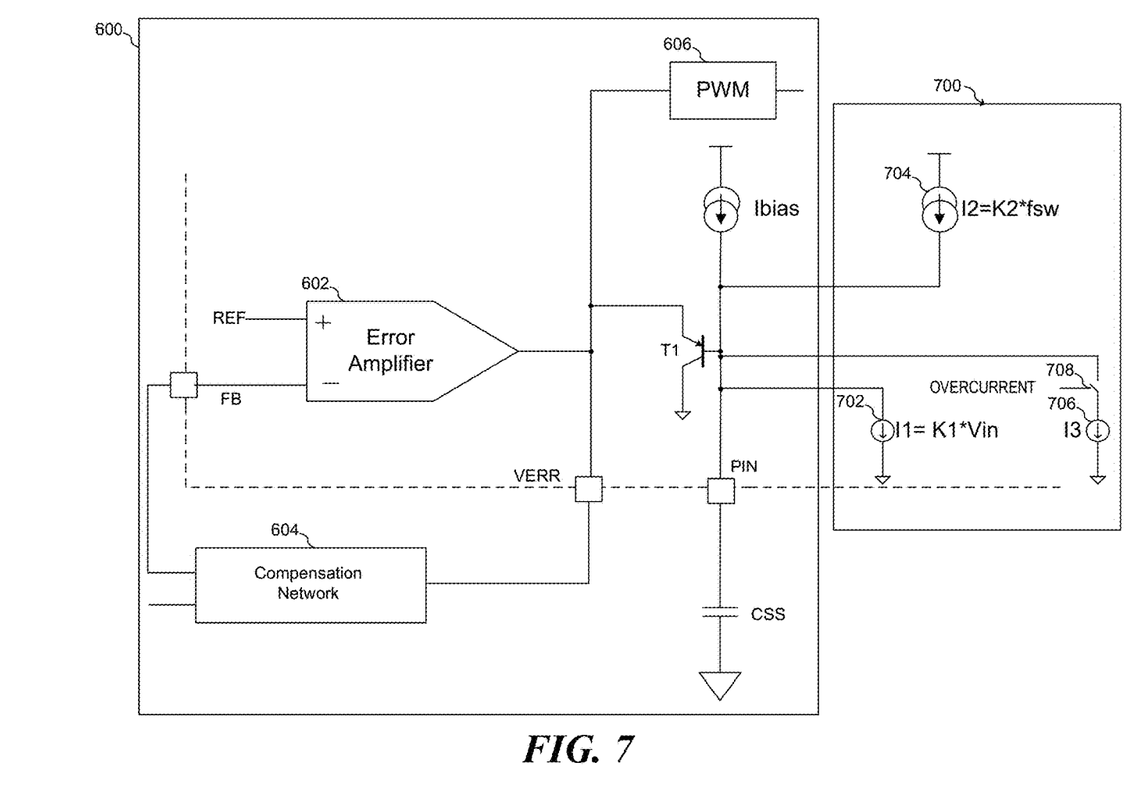
FIG. 7 illustrates a start-up circuit according to another embodiment.

FIG. 7 illustrates an embodiment of the present invention that uses analog components such as current sources to control the duty cycle during start-up. The system uses different current sources to charge up or down a capacitor to control a slew rate of a voltage described in equation 4. The current sources are chosen such that they are proportional to an input voltage Vin and a switching frequency $f_{sw}$ of the SMPS. As shown in FIG. 7, the start-up control system 700 is added to the start-up system 600 described in FIG. 6, where the start-up time is controlled by a current source I1 that has a linear relation with the input voltage Vin, given by the equation:

$$I1 = K1 \cdot Vin, \qquad (5)$$

where K1 is a constant. The start-up time is further controlled by a second current source I2 that has a linear relation with the switching frequency $f_{sw}$, given by the equation:

$$I2=K2*f_{sw}, \quad (6)$$

where
K2 is another constant. A third current source I3 of a predetermined value is used during an overcurrent condition. In an embodiment, the start-up time is controlled by the amount of current used to charge an external capacitor Css. In other embodiments, the capacitor Css can be integrated inside an IC. A ramp generated in the base node of the bipolar transistor T1 is replicated by the emitter with a voltage shift. The slew rate of the emitter of T1 controls the start-up time of the SMPS. The rate of charging of the base node is the sum of the currents Ibias, I1 and I2 across the capacitor Css. Accordingly, if the input voltage Vin and/or the switching frequency $f_{sw}$ change, the currents I1 and I2 also change and adjust the start-up time of the SMPS accordingly. In an application, a large input voltage Vin results in a large value of current I1, which causes a long or slow ramp time of the base node and accordingly a slow start-up time.

In another application, a large value of I2 translates to a large value of current charging the base node of the pnp transistor T1 and hence a short start-up time. A fast switching frequency $f_{sw}$ translates to a high value of I2 and a fast start-up time. The embodiment also provides a control to decrease the duty cycle by having a current I3 that is switched when an overcurrent condition is detected. A suitable designed value of current source I3 lowers the voltage applied to a pulse width modulation (PWM) generator 606 and a lower duty cycle is generated. In other embodiments, the pnp transistor T1 can be replaced by metal oxide semiconductor (MOS) transistor.

Figure 8:
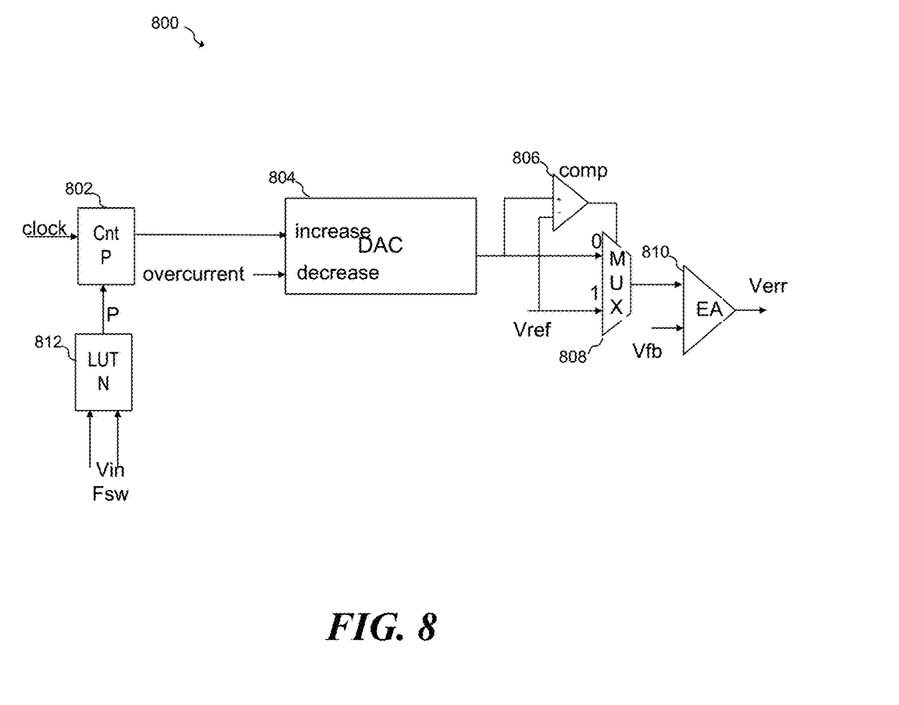
FIG. 8 illustrates a mixed signal start-up circuit according to another embodiment.

FIG. 8 illustrates another embodiment start-up control system 800 for the SMPS using a closed loop method. The start-up control system 800 includes a digital to analog converter (DAC) 804 that is incremented at a rate proportional to the input voltage Vin and the switching frequency $f_{sw}$ of the SMPS. A clock is used to a counter 802 that uses a count value P generated from a look up table (LUT) 812. The count value P is computed based on the input voltage Vin and the switching frequency $f_{sw}$ of the SMPS. The start-up time is controlled by the rate of increment of the DAC 804 output. The DAC 804 output is provided to an error amplifier 810 that integrates an error between a feedback value Vfb of an output voltage of the SMPS and the DAC 804 output. The output of the error amplifier 810 is provided to a PWM generator circuit to generate a PWM duty cycle. When the DAC 804 output value reaches a reference value Vref, the input to the error amplifier is replaced with the reference value Vref. The loop then transitions to a closed loop operation and starts generating a duty cycle based on the error between the reference value Vref and the feedback value Vfb.

The overcurrent situation is handled by decreasing the DAC 804 output until the overcurrent condition is removed. The input to the error amplifier 810 is controlled by a multiplexer (MUX) 808 that selects between the DAC 804 output and the reference value Vref. The error amplifier 810 uses the DAC 804 output during start-up mode and during the PWM mode it selects the reference value Vref which is a target output voltage of the SMPS. The duty cycle generated by the PWM increases as the DAC 804 output value increases. The SMPS output voltage increases as the duty cycle increases. The MUX 808 output is controlled by the output of a comparator 806 comparing the DAC 804 output and the reference value Vref. In other embodiments, the count value P is computed using a complex algorithm or a micro-controller or a digital signal processor (DSP).

Figure 9:
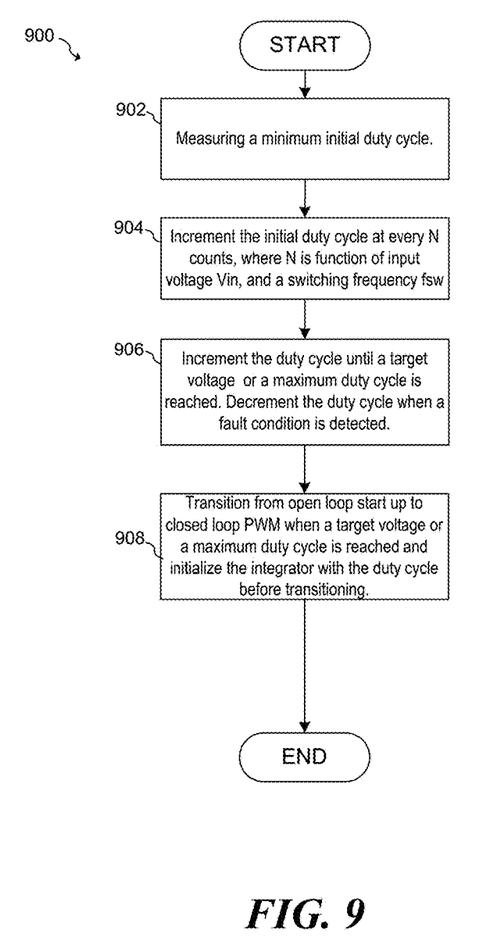
FIG. 9 illustrates a flowchart of an embodiment method.

FIG. 9 illustrates a flowchart of an embodiment method 900 for starting a switched-mode power supply (SMPS). The method begins at step 902 where a minimum initial duty cycle is measured and applied at the beginning of the start-up. The flow diagram then moves to step 904 where the minimum initial duty cycle is incremented at every N counts while the SMPS starts up in an open loop mode. The value of N is calculated based on an input voltage Vin and a switching frequency $f_{sw}$ of the SMPS. In step 906, the duty cycle is incremented until a target voltage or a maximum duty cycle value is reached. The duty cycle is decremented if a fault condition is detected. The fault condition may include at least one of an overcurrent, an overvoltage, an under voltage and an over temperature condition of the SMPS. Finally, at step 908, a transition occurs from the open loop start-up mode to a closed loop pulse width modulation (PWM) mode. The transition occurs only when the SMPS reaches a target voltage or the duty cycle of the SMPS reaches a maximum duty cycle value. The duty cycle value during the transition is initialized to an integrator of a feedback control loop of the SMPS before the SMPS makes the transition from open loop start-up mode to closed loop PWM mode.

Figure 10:
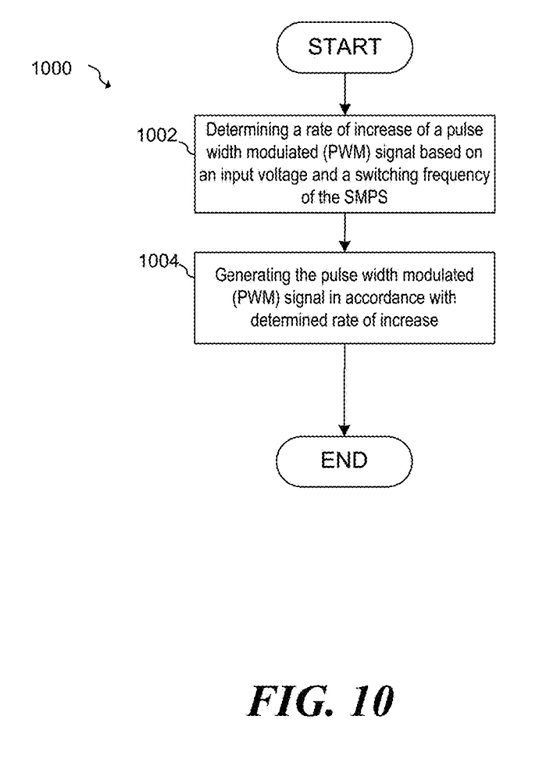
FIG. 10 illustrates a flow chart of an embodiment method.

FIG. 10 illustrates a flowchart for another embodiment method 1000 for starting a SMPS. The method begins at step 1002 where a rate of increase of a pulse width modulated (PWM) signal is determined. The rate is determined based on an input voltage Vin and a switching frequency $f_{sw}$ of the SMPS. The flow moves to step 1004, where a pulse width modulated (PWM) signal is generated based on the rate of increase determined in step 1002.

Embodiments of the present invention may be applied to different SMPS start-up control circuits. In some embodiments, different start-up times may be designed for different input voltages.

In accordance with various embodiments, circuits or systems may be configured to perform particular operations or actions by virtue of having hardware, software, firmware, or a combination of them installed on the system that in operation causes or cause the system to perform the actions. One general aspect includes a method of operating a switched-mode power supply (SMPS). The method includes starting up the switched-mode power supply, starting up including determining a rate of increase of a duty cycle of a pulse width modulated (PWM) signal based on an input voltage and a switching frequency of the SMPS; and generating the PWM signal having the duty cycle in accordance with determined rate of increase.

Implementations may include one or more of the following features. The method where the duty cycle of the PWM signal increases until an exit condition is reached. The method where the exit condition includes at least one of an output voltage of the SMPS reaching a target voltage and the duty cycle reaching a threshold value. The method where the exit condition further includes the SMPS transitioning from starting-up to a closed loop PWM mode operation. The method where the starting up of the SMPS further includes detecting an overcurrent condition. The method further including decreasing the duty cycle of the PWM signal when the overcurrent is detected. The method where determining the rate includes using a look up table (LUT). The method where the determined rate is proportional to the input voltage and the switching frequency of the SMPS.

In some embodiments, starting up of the SMPS further includes generating an initial value of the duty cycle, incrementing the initial value of the duty cycle based on a first value, decrementing the duty cycle when a fault condition is detected, and storing a second value generated during an exit condition for use in open loop PWM mode. In some embodiments, generating the initial value includes using a look up table (LUT). The first value may be an output of an integrator in an integral-proportional-derivative (PID) controller of the SMPS. The fault condition may be at least one of an over-current condition, an over-temperature condition, an under-voltage condition, and an over-voltage. In some embodiments, storing the second value includes storing the second value in a digital storage element, which may include an accumulator. Alternatively, storing the second value includes storing the second value in an analog storage element, which may be implemented using a capacitor.

Another general aspect includes a switched-mode power supply controller having a pulse-width modulator, a start-up control circuit including a slope calculation circuit configured to determine a rate of change of a duty cycle for starting up a switched-mode power supply based on an input voltage and a switching frequency, and a slope generator having an output coupled to a control input of the pulse-width modulator, where the slope generator is configured to produce a slope according to the determined rate of change.

Implementations may include one or more of the following features. The switched-mode power supply controller including a dynamic controller coupled between a feedback output of the switched-mode power supply and the input to the pulse-width modulator. The switched-mode power supply controller may further include an exit condition detector and a selection circuit coupled to the exit condition detector and to the input of the pulse-width modulator. The selection circuit may be configured to route the input of the pulse width modulator to one an output of a dynamic controller and the output of the slope generator based an exit condition detected by the exit condition detector. In another embodiment, the exit condition detector is configured to detect when an output signal of the switched-mode power supply reaches a target value. The exit condition detector may be further configured to detect an over current condition of the switched-mode power supply. In an embodiment, the dynamic controller includes an integrator and the start-up controller is configured to initialize the integrator with a duty cycle value upon detection of the exit condition.

In some embodiments, the switched-mode power supply controller further includes the dynamic controller coupled between a feedback output of the switched-mode power supply and the input to the pulse-width modulator and a limiter circuit configured to limit an output of the dynamic controller to an output value of the slope generator. In some embodiments, the slope generator includes a counter. In a further embodiment, the slope generator includes a controllable current source coupled to a capacitor; such that the controllable current source is configured to provide a current based on the determined rate of change.

A further general aspect includes a switched-mode power supply (SMPS) system having a dynamic controller, a slope calculator configured to calculate a slope of a duty cycle of a pulse width modulated signal for starting up the SMPS based on an input voltage of the SMPS and a switching frequency of the pulse width modulated signal, a slope generator having an output configured to produce a sloped signal according to the calculated slope, a mode selection circuit configured to select the output of the slope generator during a startup mode of the SMPS and to select an output of the dynamic controller during a closed-loop operation mode of the SMPS, and a pulse width modulator coupled to an output of the mode selection circuit.

In some embodiments, the mode selection circuit is configured to transition the SMPS from the startup mode to the closed-loop operation mode when an output of the SMPS reaches a target voltage.

An advantage of embodiments includes the ability to control the start-up time based on the switching frequency $f_{sw}$. The duty cycle generated at the end of the start-up provides for a smooth transition between open loop start-up and closed loop PWM. Some embodiments may eliminate any overcurrent or overvoltage situation at the transition from starting up the SMPS to operating the SMPS in PWM mode. A further advantage of some embodiments includes robust handling of a fault such as an overcurrent condition by reducing the duty cycle until the overcurrent condition is removed.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a switched-mode power supply (SMPS), the method comprising:
    starting up the SMPS in an open loop mode of operation comprising
        determining a rate of increase of a duty cycle of a pulse width modulated (PWM) signal over a plurality of cycles based on an input voltage and a switching frequency of the SMPS,
        generating the PWM signal having the duty cycle in accordance with the determined rate of increase until an exit condition is reached, and
        generating an initial closed loop duty cycle value when the exit condition is reached; and
    transitioning operation of the SMPS from the starting up to a closed loop mode of operation, transitioning comprising initializing a dynamic controller with the initial closed loop duty cycle value.

2. The method of claim 1, wherein the exit condition comprises at least one of an output voltage of the SMPS reaching a target voltage or the duty cycle reaching a threshold value.

3. The method of claim 1, wherein the starting up of the SMPS further comprises detecting an overcurrent condition.

4. The method of claim 3, further comprising decreasing the duty cycle of the PWM signal when the overcurrent condition is detected.

5. The method of claim 1, wherein the determining the rate of increase comprises using a look up table (LUT).

6. The method of claim 1, wherein the determined rate of increase is proportional to the input voltage and the switching frequency of the SMPS.

7. A method of operating a switched-mode power supply (SMPS), the method comprising:
    starting up the SMPS comprising
        determining a rate of increase of a duty cycle of a pulse width modulated (PWM) signal over a plurality of cycles based on an input voltage and a switching frequency of the SMPS,
        generating the PWM signal having the duty cycle in accordance with the determined rate of increase until an exit condition is reached, generating an initial closed loop duty cycle value when the exit condition is reached;
generating an initial value of the duty cycle,
incrementing the initial value of the duty cycle based on a first value,
decrementing the duty cycle when a fault condition is detected,
storing the initial closed loop duty cycle value when the exit condition is reached; and
transitioning operation of the SMPS from the starting up to a closed loop mode of operation, transitioning comprising initializing a dynamic controller with the initial closed loop duty cycle value.

8. The method of claim 7, wherein generating the initial value comprises using a look up table (LUT).

9. The method of claim 7, wherein the first value is an output of an integrator in an integral-proportional-derivative (PID) controller of the SMPS.

10. The method of claim 7, wherein the fault condition is at least one of an over-current condition, an over-temperature condition, an under-voltage condition, and an over-voltage.

11. The method of claim 7, wherein the storing the initial closed loop duty cycle value comprises storing the initial closed loop duty cycle value in a digital storage element.

12. The method of claim 11, wherein the digital storage element comprises an accumulator.

13. The method of claim 7, wherein the storing the initial closed loop duty cycle value comprises storing the initial closed loop duty cycle value in an analog storage element.

14. The method of claim 13, wherein the analog storage element comprises a capacitor.

15. A switched-mode power supply controller comprising:
a pulse-width modulator; and
a start-up control circuit comprising:
a slope calculation circuit configured to determine a rate of change of a duty cycle for starting up a switched-mode power supply based on an input voltage and a switching frequency; and
a slope generator having an output coupled to a control input of the pulse-width modulator, the slope generator configured to produce a slope according to the determined rate of change;
an exit condition detector; and
a selection circuit coupled to the exit condition detector and to the control input of the pulse-width modulator, the selection circuit configured to route the control input of the pulse-width modulator either to an output of a dynamic controller or to the output of the slope generator based on a first exit condition detected by the exit condition detector.

16. The switched-mode power supply controller of claim 15, further comprising a dynamic controller coupled between a feedback output of the switched-mode power supply and the control input of the pulse-width modulator.

17. The switched-mode power supply controller of claim 15, wherein the exit condition detector is configured to detect when an output signal of the switched-mode power supply reaches a target value.

18. The switched-mode power supply controller of claim 17, wherein the exit condition detector is further configured to detect an over current condition of the switched-mode power supply.

19. The switched-mode power supply controller of claim 15, wherein:
the dynamic controller comprises an integrator; and
the start-up control circuit is configured to initialize the integrator with a duty cycle value upon detection of the first exit condition.

20. The switched-mode power supply controller of claim 19, further comprising the dynamic controller coupled between a feedback output of the switched-mode power supply and the control input of the pulse-width modulator; and
a limiter circuit configured to limit an output of the dynamic controller to an output value of the slope generator.

21. The switched-mode power supply controller of claim 15, wherein the slope generator comprises a counter.

22. The switched-mode power supply controller of claim 15, wherein:
the slope generator comprises a controllable current source coupled to a capacitor; and
the controllable current source is configured to provide a current based on the determined rate of change.

23. A switched-mode power supply (SMPS) system comprising:
a dynamic controller;
a slope calculator configured to calculate a slope of a duty cycle of a pulse width modulated signal for starting up the SMPS based on an input voltage of the SMPS and a switching frequency of the pulse width modulated signal;
a slope generator having an output configured to produce a sloped signal according to the calculated slope;
a mode selection circuit configured to select the output of the slope generator during a startup mode of the SMPS and to select an output of the dynamic controller during a closed-loop operation mode of the SMPS; and
a pulse width modulator coupled to an output of the mode selection circuit.

24. The system of claim 23, wherein the mode selection circuit is configured to transition the SMPS from the startup mode to the closed-loop operation mode when an output of the SMPS reaches a target voltage.

25. The method of claim 1, wherein generating the initial closed loop duty cycle value comprises using a last duty cycle value during the starting up.

26. The method of claim 1, further comprising operating the SMPS in a closed loop mode of operation, wherein operating the SMPS in the closed loop mode of operation comprises using the dynamic controller to generate the duty cycle.

* * * * *